United States Patent [19]

McKenna, Jr. et al.

[11] Patent Number: 5,187,927
[45] Date of Patent: Feb. 23, 1993

[54] TRAY FOR FRUIT HARVESTING SYSTEM

[75] Inventors: Frank J. McKenna, Jr., Shaker Hts., Ohio; Richard K. Horst; James F. Horst, both of Orrville, all of Ohio; Charles S. Wright, Leesburg; John D. Matthew, Melbourne, both of Fla.

[73] Assignee: Frank J. McKenna, Jr., Shaker Hts., Ohio

[21] Appl. No.: 879,184

[22] Filed: May 5, 1992

Related U.S. Application Data

[60] Division of Ser. No. 802,362, Dec. 4, 1991, which is a continuation-in-part of Ser. No. 572,153, Aug. 23, 1990.

[51] Int. Cl.$^5$ .................................... A01D 46/24
[52] U.S. Cl. ............................ 56/328.1; 56/329
[58] Field of Search ............ 56/328.1, 329, 480, 56/DIG. 8, DIG. 9

[56] References Cited

U.S. PATENT DOCUMENTS

| | | | |
|---|---|---|---|
| 4,608,725 | 9/1986 | Jackson | 56/328.1 |
| 5,007,772 | 4/1991 | McKenna et al. | 56/328.1 X |
| 5,125,223 | 6/1992 | McKenna et al. | 56/328.1 |

Primary Examiner—Thuy M. Bui
Attorney, Agent, or Firm—Calfee, Halter & Griswold

[57] ABSTRACT

A fruit harvesting apparatus is provided which includes a vehicle having a front end and a back end; a mechanism for moving the vehicle along the ground; a tray, located at the back end of the vehicle, for receiving picked fruit; a pivotable hopper, mounted to the back end of the vehicle, for temporarily storing the picked fruit; and a transfer system for transferring the picked fruit from the tray to the hopper. The tray includes a bottom wall and a set of substantially vertical walls surrounding the bottom wall. The set of substantially vertical walls includes a back wall which is attached to the front end of the vehicle and a pair of side walls extending from opposite ends of the back wall. The tray further includes a channel formed at least partially by channel-forming sections of the bottom wall. The channel includes a rear edge defining a tray opening and a substantially planar lower wall sloping towards the tray opening. The transfer system is connected to the tray opening and includes a lower wall which together with the lower wall of the channel forms a smooth transition surface between the tray and the transfer system. The transfer system extends from the tray opening to the hopper.

4 Claims, 10 Drawing Sheets

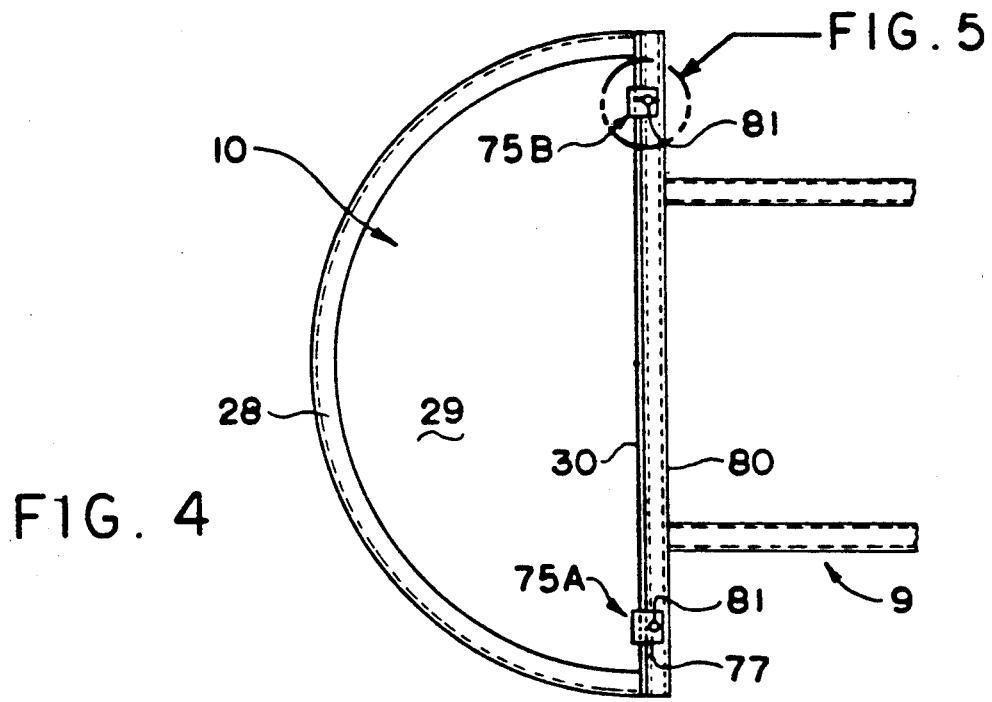
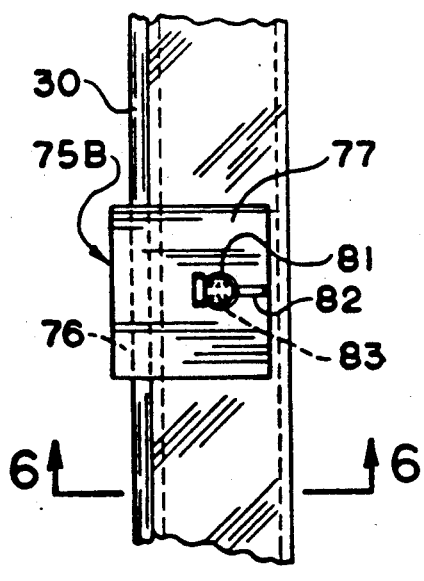
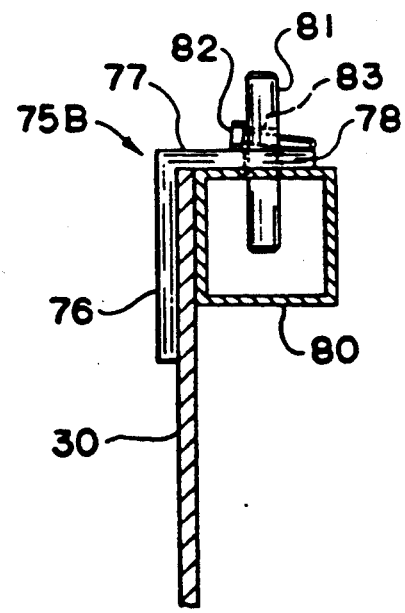

TRAY FOR FRUIT HARVESTING SYSTEM

This is a divisional of co-pending application Ser. No. 07/802,362 filed on Dec. 4, 1991, which is a continuation-in-part of Ser. No. 572,153, Aug. 23, 1990.

FIELD OF THE INVENTION

The invention relates to a self-propelled mechanical harvesting apparatus which enables multiple workers to more efficiently pick and collect citrus fruits from young or "low density" citrus trees.

BACKGROUND AND SUMMARY OF THE INVENTION

Citrus fruits are generally harvested by hand picking and the conventional harvesting method includes the use of pick sacks, pallet tubs, and expensive in-grove vehicles with booms. More specifically, during a typical harvesting operation, a citrus fruit picker picks the fruit from a tree and places it in a pick sack which is swung over his/her shoulder and which has, for example, a sixty pound capacity. When the pick sack is full, the fruit picker carries it to a pallet tub empties the fruit into the pallet tub, and then returns to the next tree with an empty sack to repeat the cycle.

A full pallet tub will commonly have a ten box capacity and will weigh about nine hundred pounds. A full tub will usually be emptied shortly after it is filled by an expensive in-grove vehicle with a boom, such as a field truck or "loader" (sometimes also called a goat) which moves along with the pickers during the harvesting process. A loader is a modified truck equipped with a rotatably mounted hydraulic boom specifically designed to lift and empty a fruit filled pallet tub into the loader's bed. The loader's bed is designed so that it may empty the fruit into a trailer which then hauls the fruit to a processing plant.

In a typical harvesting system, a large number of pallet tubs are strategically placed throughout the grove so that they will be substantially filled during a harvesting operation. Thus, the distance between the respective pallet tubs will be determined by the amount of citrus fruit on the trees between the pallet tubs. For example, in established citrus groves with "high density trees", the tubs will be arranged relatively close to one another. More particularly, a "high density" orange grove, or one having trees which are eight to ten years old, will yield about 1,100 oranges per tree. A ten box pallet tub will hold about 2,200 oranges which represents the average production from two "high density" orange trees. Thus, the pallet tubs may be arranged between every other tree in such an orange grove and this arrangement results in a very short walking distance between the tree from which the fruit is being picked and the pallet tub into which the fruit is emptied. Because the time when a worker walks is essentially dead time in the harvesting season, the shorter the walking distance, the more productive a picker.

Conversely, in young citrus groves with "low density" fruit trees, the pallet tubs will be spaced further apart. More particularly, a low density orange grove will contain young trees which are two to four years old and which average about eight to twelve oranges a tree per year. Thus, a picker would have to harvest about two hundred and twenty trees to fill one "ten box" or "2,200 orange" pallet tub and a picker will have to walk about 3,520 feet to fill one pallet tub. (Assuming that the trees are spaced about sixteen feet apart). Needless to say, this significant walking distance reflects negatively upon a picker's efficiency. It is important to note that this inefficient picking pattern can not be cured by simply providing more pallet tubs because of the significant cost of operating a loader. More particularly, if a loader was to move along with a small group of "low density" pickers, this expensive piece of equipment would either be idle or would inefficiently be continuously moving partially filled pallet tubs as the pickers move from tree to tree.

For these reasons, citrus growers are commonly charged two to three times the normal picking rate to have their low density, young trees picked. As a result, most growers cannot afford to justify the additional cost to have the fruit picked from their young trees until the trees reach a minimum production of about 30 oranges per tree.

In the past, high density groves were gradually replaced with low density groves thereby comfortably allowing this practice. However, a series of freezes during the past eight years have substantially reduced the number of high density groves and precipitated a sharp increase in the number of newly planted citrus groves. As such, the citrus industry has recently been forced to look to low density groves to satisfy the demand for citrus products, such as orange juice concentrate. However, at the same time, changes in the Immigration Act have made it extremely difficult and expensive to harvest citrus fruit from these low density citrus trees.

In response to these unfortunate freezes, the citrus industry has recently begun to reconsider the advantages of planting trees more closely together in rows and arranging these rows of trees so that the aisles therebetween are narrower. For example, groves have been planted with trees spaced eight feet apart with fifteen foot wide aisles. This increased compactness is believed to provide some protection against frost conditions and reduces the walking distances required for picking these young trees. However, this arrangement also creates harvesting complications because it is difficult to move and position the pallet tubs and difficult to maneuver and use the loader.

The present invention provides a fruit harvesting apparatus which is particularly adapted for harvesting young "low density" citrus trees. The apparatus includes a vehicle having a front end and a back end, and means for moving the vehicle along the ground. A tray is mounted to the front end of the vehicle for receiving the picked fruit and a pivotable hopper is mounted to the back end of the vehicle for temporarily storing the picked fruit. A transfer system is provided for transferring picked fruit from the tray to the hopper. The bottom wall of the tray does not include a horizontal opening.

A fruit harvesting apparatus according to the present invention allows four to ten workers to walk alongside the machine. For example, two to five workers could walk on either side, simultaneously picking and continuously placing the picked fruit in the tray as the machine is driven down the row of trees being picked. The production from a picker is increased because the invention reduces the distances walked and thus affords the picker more time and energy to pick fruit. The person driving the vehicle can also supervise the pickers and in part control the speed of the picking process by controlling the speed of the vehicle.

Initial experimental field tests indicate the present invention enable six pickers and one person driving the machine to harvest about 115,000 oranges a day from young trees. This output is a substantial increase from that realized with the current method of using pallet tubs and a loader which requires about 15 to 18 pickers and one driver to pick the same volume of oranges from young trees in a day. This increased output is reflected in cost savings to a citrus grower and these cost savings are further magnified by the fact that the invention eliminates the use of pallet tubs and expensive loaders.

The present invention additionally provides the flexibility of custom designing the width/shape of the tray to work within the various planting configurations employed in different groves. More particularly, the tray is removably mounted on the vehicle to allow a tray of different size/shape to be selectively mounted thereon. In this manner, a tray may be chosen which has a geometry compatible with the configuration of the grove being picked. For example, in a grove having narrow aisles, a tray of reduced width would be selected and mounted on the vehicle.

Applicants have further discovered that in such a fruit harvesting apparatus, the design of the tray is an important operational concern. For example, the clogging of fruit as it enters the transfer system is extremely undesirable and the chances of such clogging commonly escalate as the size of the crew (and thus picked fruit volume) increase. A typical cause of such clogging will occur when the connection between the tray and the transfer system requires an elbow, especially in pneumatic systems. Additionally, clogging is believed to occur when the area of the bottom wall of the tray does not evenly distribute and control the flow of fruit as it travels towards the connection between the tray and the transfer system. More particularly, fruit sometimes gathers along side of the tray opening and wedges on the edge of the tray opening when two or more pieces of fruit try to enter the transfer system at the same time.

The present invention is believed to solve these clogging problems by providing a smooth transition surface between the tray and the transfer system whereby the use of an elbow is not required. Additionally, the bottom wall of the tray is provided with channel-forming sections which form a channel. The channel restricts the amount of fruit that can flow towards the opening and aligns the fruit with the tray opening prior to the time the fruit enters the pneumatic transfer system. As a result, the suction from the transfer system will travel into the channel whereby it acts as a continuation of the transfer system and gradually pulls the picked fruit from the channel through the opening and into the transfer system. The lower wall of the channel is substantially planar and slopes downwardly towards an end edge of the channel which at least partially defines the tray opening. The inclusion of such a channel in the tray is believed to improve the efficiency of the tray by controlling the volume of fruit flowing towards the tray opening and thereby helping to eliminate the clogging of the fruit as it enters the transfer system. The channel may be directed towards either a back wall or a side wall of the tray depending on the application. Additionally, in either case, the opening may be positioned in front of, in back of, or aligned with the back/side wall.

Furthermore, the bottom wall of the tray is provided with discrete section(s) which slope downwardly towards this channel. These sections will help to align the fruit as it travels into the channel. The slope of the bottom wall may be selectively adjusted by including a slope-adjusting device which pivotally adjusts the slope of the bottom wall relative to the side walls, as well as the lower wall of the channel. This slope-adjusting device may include a mechanical, manual or automatic slope-determining assembly.

Another significant concern in the design of the tray is its height from the ground. More particularly, it is important that the height of the tray be such that lifting and emptying a potentially heavy container, such as a pick bag, does not unduly task the fruit picker. The present invention provides a tray which may be mounted about 2.5 feet from the ground, the same average height of the conventional pallet tub which is about 2.5 feet. In this manner, the workers may easily empty their pick sacks into the tray. To achieve these height requirements, the bottom wall may include symmetrical sloping sections whereby only half the height of the walls is necessary to acquire the desired pitch, or slope, of the bottom wall.

Yet another significant concern in the design of the tray is the ability of it to accommodate a variety of vehicles such as those in which the transfer system is not centrally located. This accommodation is necessary or at least desirable due to the large capital costs associated with such vehicles, and the purpose of many growers to use existing machinery, such as boom machines or other farm equipment. The tray of the present invention is compatible with such equipment while at the same time allowing the tray to be connected to the transfer system without an elbow. More particularly, the present invention offers the manufacture and grower the option of having the tray opening directed towards either the back wall or the side wall, and in either case, located flush with, in front of, or behind, the respective wall depending on the specific structural requirements of the equipment. For example, where the back wall is used as the primary means for attaching the tray to a vehicle, the tray opening may have to be located in front or in back of the wall.

These and other features of the invention are fully described and particularly pointed out in the claims. The following descriptive annexed drawings set forth in detail certain illustrative embodiments. However these embodiments are indicative of but a few of the various ways in which the principles of the invention may be employed.

BRIEF DESCRIPTION OF THE DRAWINGS

In the annexed drawings:

FIG. 4 is a plan view of a tray removably secured to the frame of a fruit harvesting vehicle;

FIG. 5 is an enlarged plan view of one of the selectively removable tray mounts, with this enlarged mount being identified as to its position relative to the vehicle by the portion of FIG. 4;

FIG. 6 is a vertical cross section taken generally plane 6—6 of FIG. 5 showing the L-shape mounting bracket for the tray;

DETAILED DESCRIPTION

Figure 1:
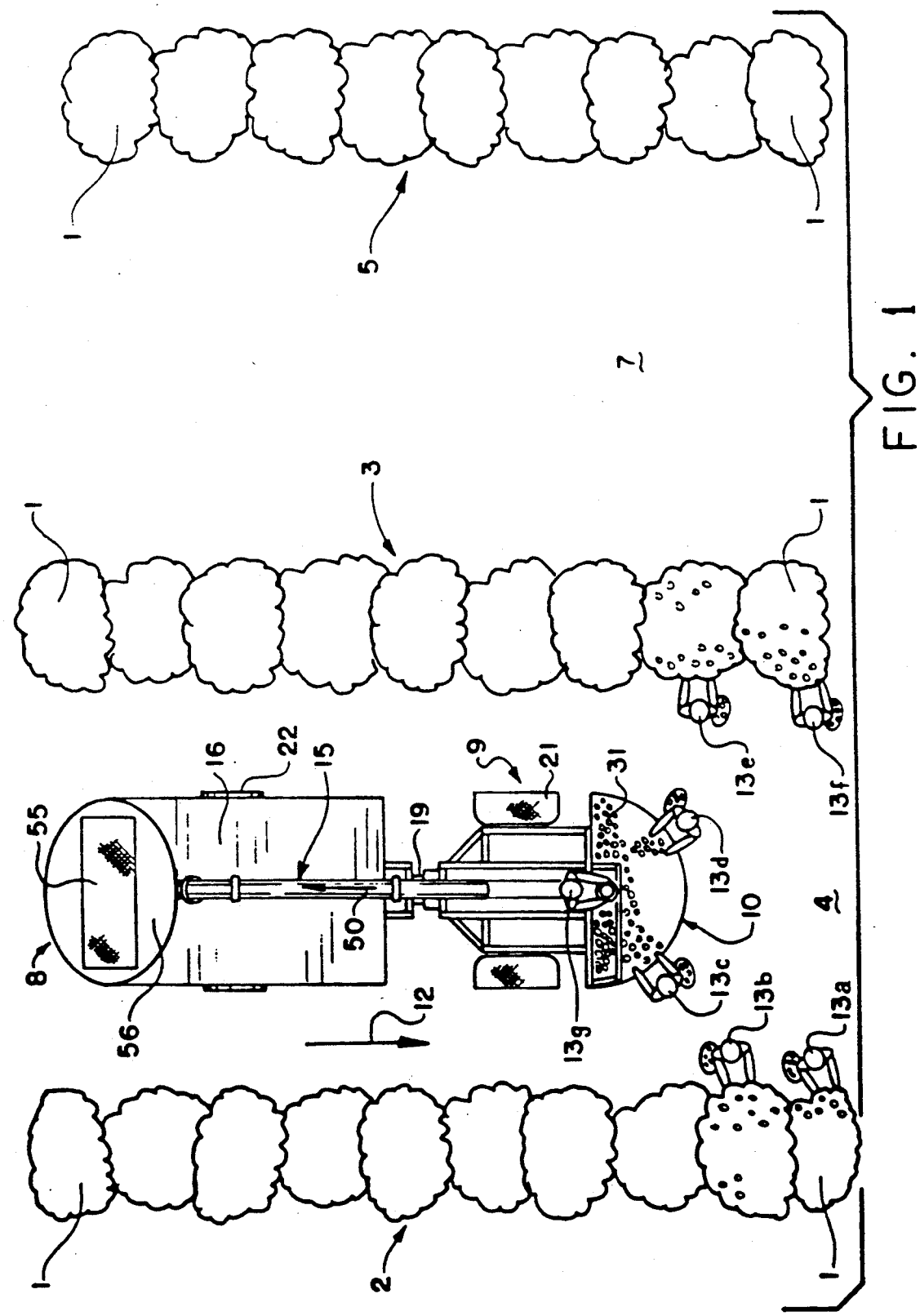
FIG. 1 is a schematic plan view showing the fruit harvesting apparatus of the present invention in operation with a picking crew moving along an aisle between rows of citrus trees.

Referring now to the drawings in detail and initially to Fig. 1, a plurality of young citrus trees 1 have been planted in close proximity to one another in a first row of citrus trees, identified generally by the reference numeral 2. A second row of young citrus trees, identified generally by the reference numeral 3, has been planted substantially parallel to the first row 2. Parallel rows 2 and 3 of citrus trees 1 define therebetween an aisle 4. Similarly, a third row of relatively young citrus trees, identified generally by the reference numeral 5, is planted in generally parallel relationship to the second row of citrus trees 3. The citrus trees in rows 3 and 5 define therebetween a second aisle 7. A number of these generally parallel rows of citrus trees defining aisles therebetween are planted on large plots of land to form a citrus tree grove.

As a result of several freezes over the past decade, many new citrus trees have been planted to replace trees lost in the freezes. The trend is to plant these new trees closer to one another in rows having narrower aisles therebetween. The present invention is directed to a fruit harvesting apparatus, indicated generally at 8, and a method for operating the same to economically pick fruit from low density young citrus trees planted in this more densely packed grove configuration.

The fruit harvesting apparatus 8 includes a self-propelled vehicle, indicated generally at 9, equipped with either two or four wheel drive, as required, for movement in either a forward or reverse direction. The vehicle 9 has a semi-circular tray, indicated generally at 10, mounted to the front end thereof. Picked citrus fruit is placed in the tray 10 by multiple persons, who have picked that fruit from the citrus trees in front of and immediately adjacent to the vehicle 9.

The citrus fruit picking crew normally consists of four to ten persons moving along in front of or to the side of the vehicle 9. The vehicle is being driven along the aisle 4 in the direction of arrow 12. The size of the crew is dependent, among other things, upon fruit density, tree spacing and manpower availability.

As shown, six persons respectively identified as 13A-13F in FIG. 1, are being utilized for picking, with a seventh person, identified as 13G, driving the vehicle 9. Pickers 13A and 13B are moving citrus fruit from trees 1 in row 2 and placing that fruit into sacks (or other containers) carried on their respective shoulders. Pickers 13E and 13F are shown as picking fruit from citrus trees 1 in row 3 and placing the picked fruit in sacks carried over their respective shoulders. Pickers 13C and 13D are placing the picked fruit from their full shoulder sacks into tray 10. The driver 13G acts as a supervisor for the crew of pickers 13A through 13F.

These pickers are usually immediately in front of and adjacent to the vehicle 9 and may be readily observed by and in oral communication with supervisor 13G. By substantially continuously moving vehicle 9 in the direction of arrow 12, the supervisor 13G is able to establish a comfortable picking speed for the pickers 13A-13F to control the speed of the fruit harvesting operation. The substantially continuous movement of the vehicle 9 also minimizes the distance between the respective pickers 13A through 13F and the tray 10 to reduce the distance that the pickers must walk to deposit the citrus fruit from their filled sacks into the tray 10. This tray 10 is mounted on the vehicle 9 adjacent the ground at a convenient height for the pickers to place the fruit into the tray. A tray height from the ground of from 2 to 2½ feet would be preferred for this purpose.

The picked fruit deposited in tray 10 is pneumatically conveyed from the tray 10 through a duct transfer system, indicated generally at 15, to a generally cylindrical hopper 16, pivotally mounted on the back portion of vehicle 9. The hopper 16 has a capacity to hold approximately 90 boxes of oranges. When the hopper 16 becomes substantially full, the picked citrus fruit temporarily stored in hopper 16 is dumped into the goat or a trailer for delivery to a collection site. The details of the vehicle 9, tray 10, duct transfer system 15 and hopper 16 are best illustrated and described in the context of FIGS. 2 and 3.

Figure 2:
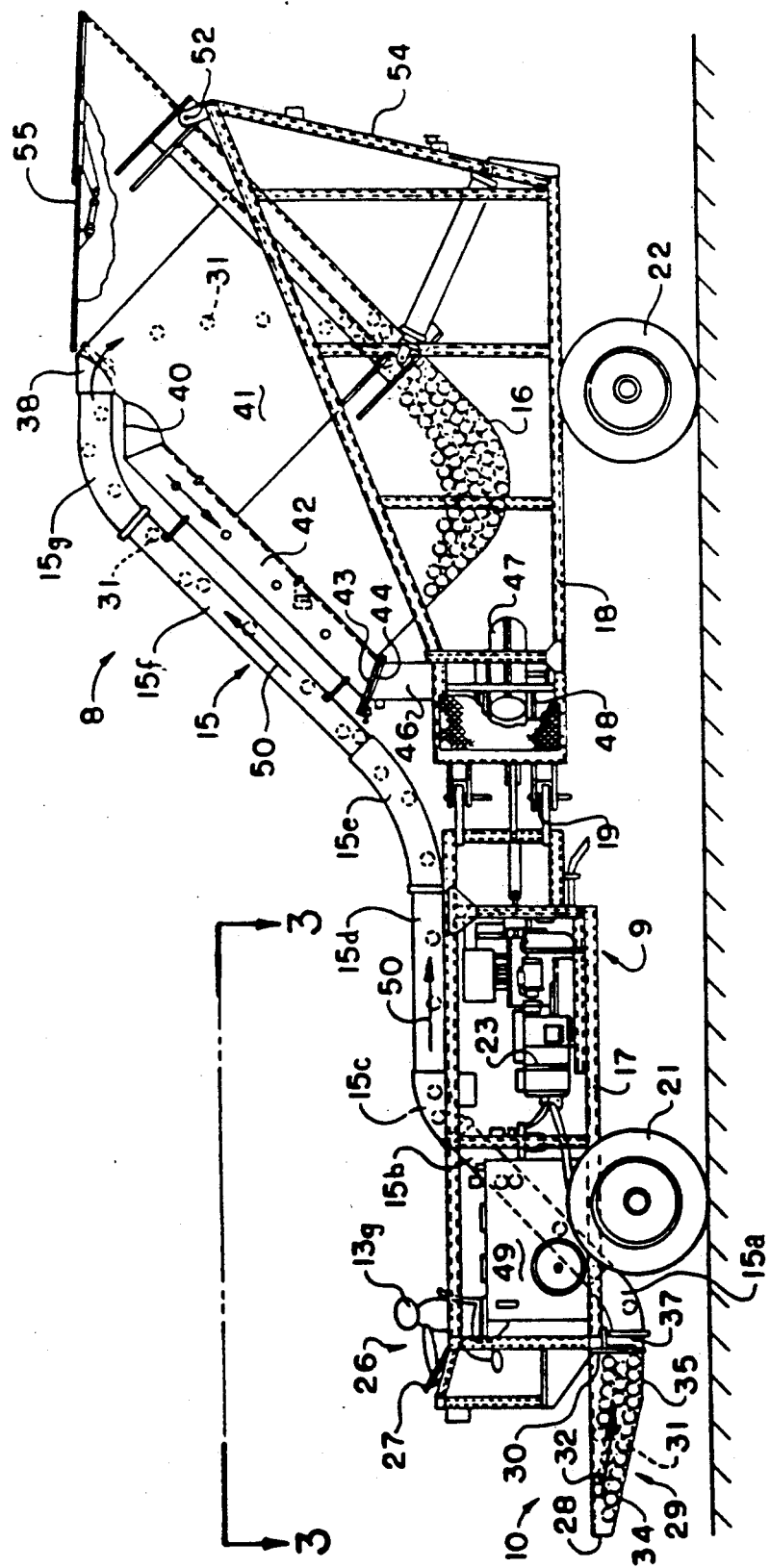
FIG. 2 is a side elevation of the fruit harvesting apparatus illustrating fruit being conveyed from the front the transfer duct system to the hopper.
Figure 3:
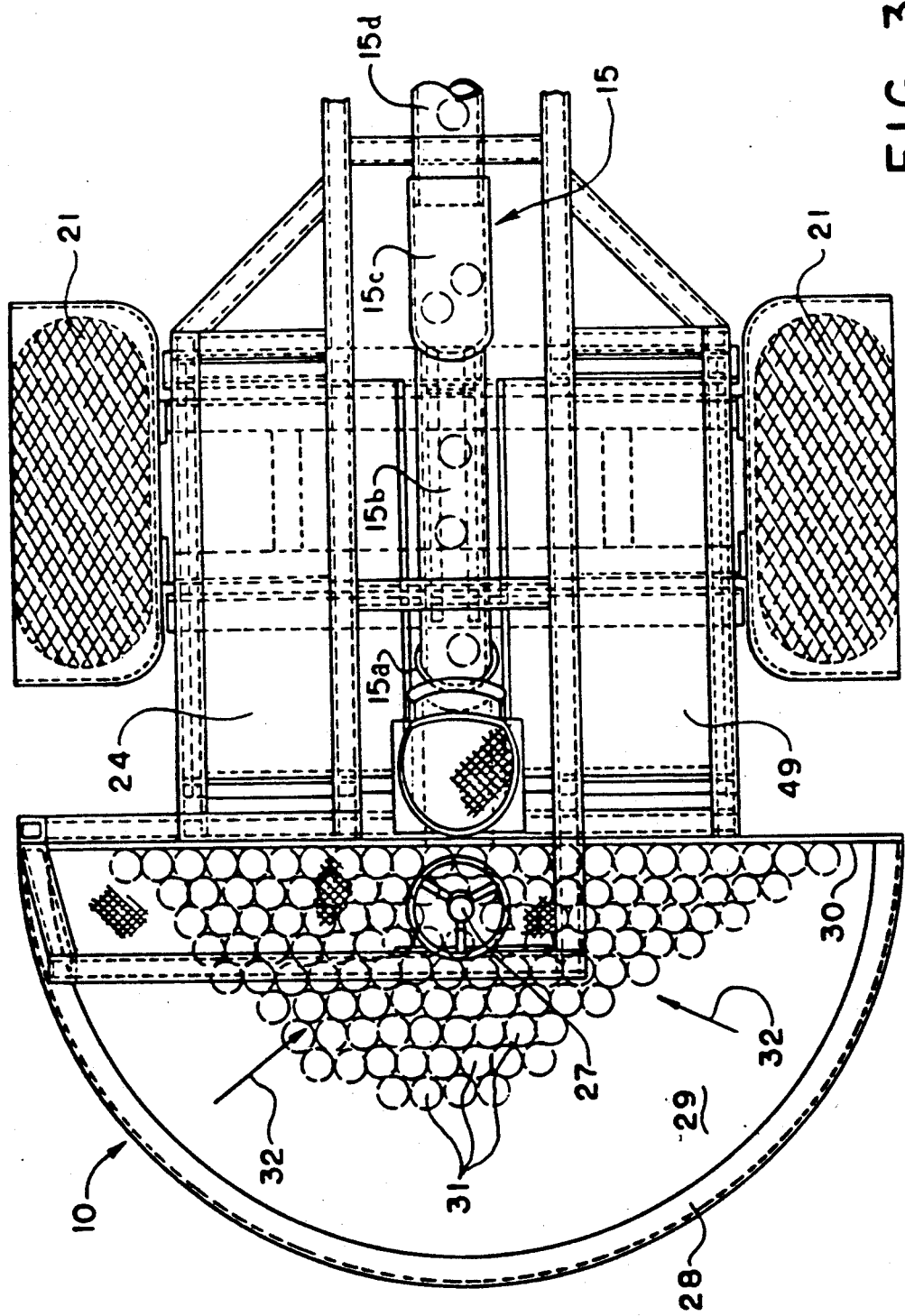
FIG. 3 is a partial plan view of the fruit harvesting apparatus taken generally along the plane 3—3 illustrating the semi-circular front tray and the driver console area.
Figure 7:
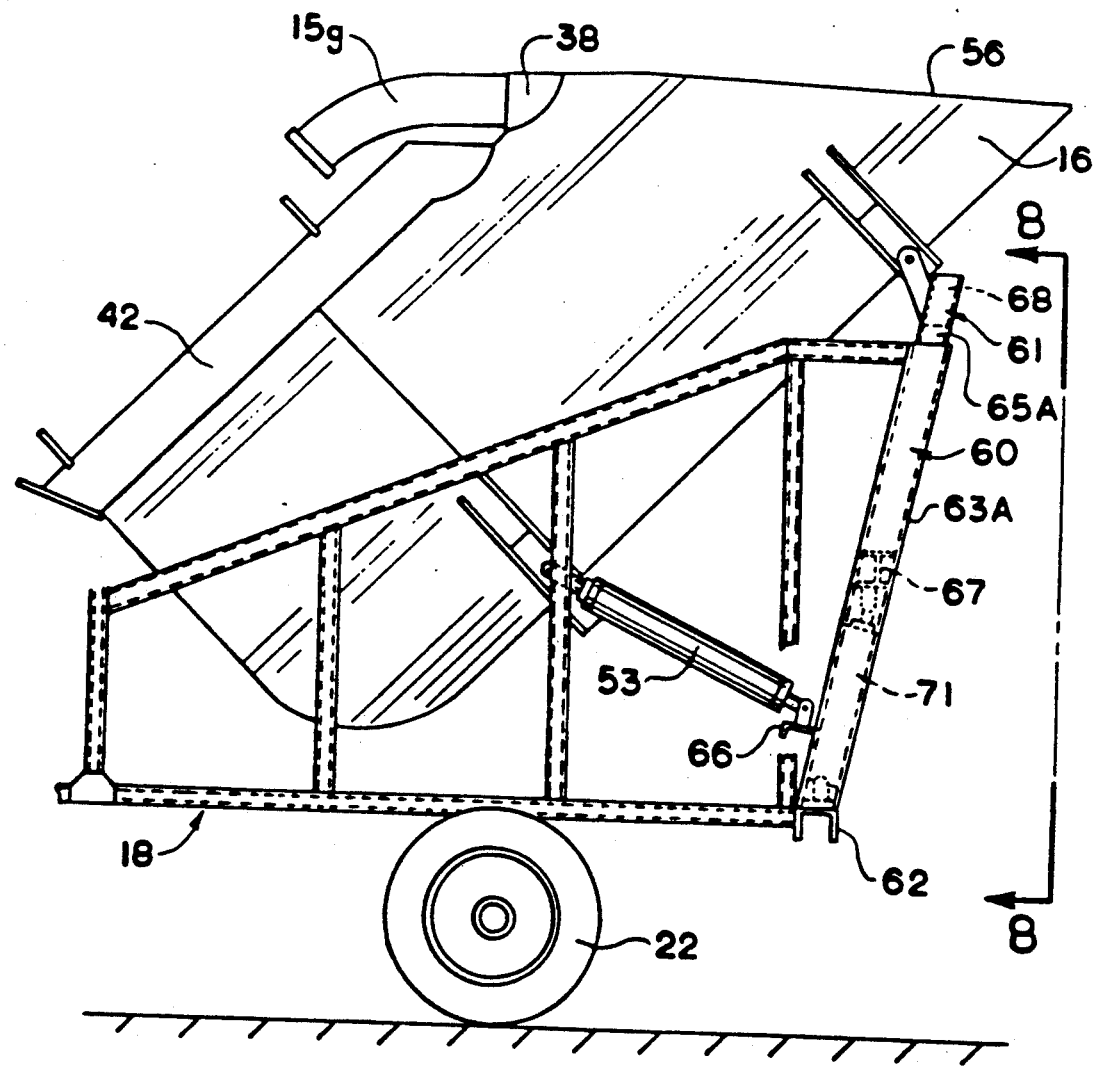
FIG. 7 is a partial side elevation similar to the back end of FIG. 3 illustrating alternative frame structure for selectively elevating the hopper relative to the vehicle.
Figure 8:
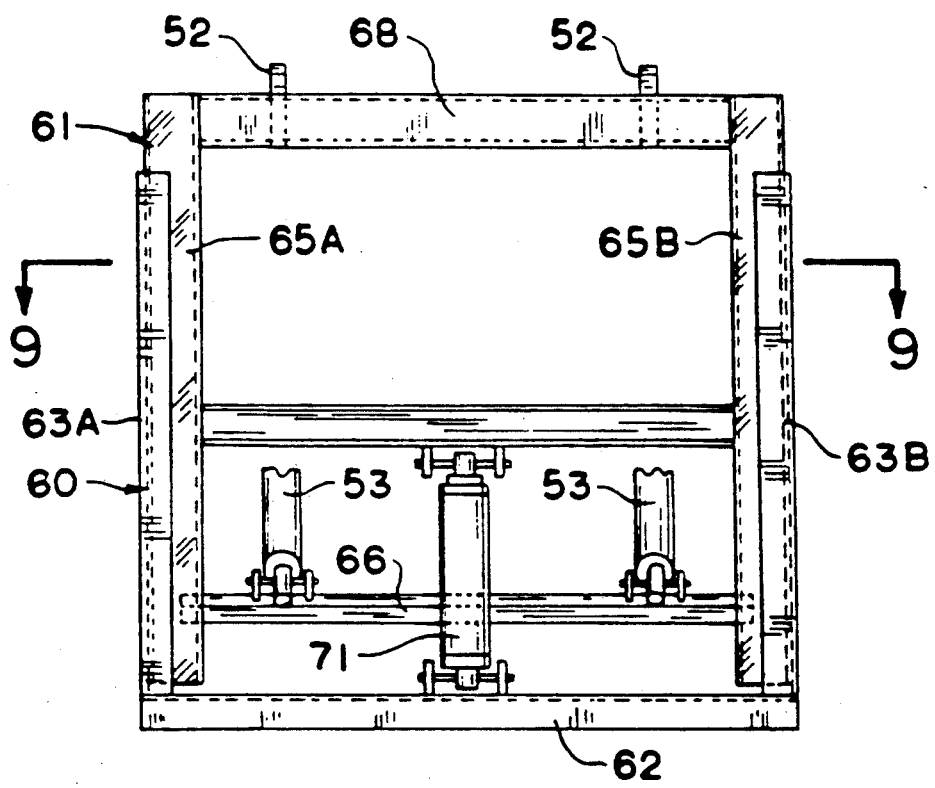
FIG. 8 is a rear elevation taken along the plane 8—8 of FIG. 7 showing the details of the fixed and movable frames selectively allowing the hopper to be raised or lowered.

Referring initially to FIG. 2, the vehicle 9 includes a front chassis assembly 17 and a rear chassis assembly 18. The front and rear chassis are hinged together as indicated at 19 to form a pivotal articulation axis therebetween generally along the axial centerline of the vehicle to assist in steering. A pair of front wheels 21 are rotatably mounted on front chassis 17, and a pair of rear wheels 22 are rotatably mounted on rear chassis 18. As is well known in the vehicle art, the front wheels 21 can be driven, the rear wheels 22 can be driven or all four wheels can be driven depending upon the desired application. A diesel engine 23 is mounted on and contained within the front chassis assembly 17 to drive the hydraulic pumps which activates the hydrostatic device to turn the wheels either forwardly or rearwardly. A fuel tank 24, as shown in FIG. 3, is mounted on the front chassis assembly 17 for supplying diesel fuel to the diesel engine 23.

The driving console section, indicated generally at 26, is positioned at the front of vehicle 9 in a relatively elevated, preferably central, position to provide good sight lines for the operator 13G. The driving console section 26 includes a steering wheel 27 for steering the vehicle 9 and contains additional conventional controls (not shown) for controlling the direction and speed of the vehicle 9 during the harvesting process in which citrus fruit is deposited in the tray 10. In addition, the driving console section includes actuators for controlling the dumping action of the hopper 16.

The tray 10 preferably has a semi-circular configuration in plan view and may extend substantially the entire width of the vehicle 9. A vehicle and tray width of approximately eight feet may be advantageous for younger trees planted in more dense configuration.

The tray 10 includes a semi-circular front wall 28, an open top, a downwardly sloping and curved bottom wall, indicated generally at 29, and a back wall 30. The bottom wall 29 slopes downwardly from the front wall 28 to the back wall 30 adjacent the front part of the vehicle 9. The downward slope of bottom wall 29 is preferably at an angle of up to about 20° relative to the horizontal. The bottom wall is also curved in a frusto conical sense to direct fruit radially inwardly toward the center of the back wall. This sloped and curved bottom wall gravity feeds the picked citrus fruit 31, which has been placed in tray 10 through the open top thereof, rearwardly, downwardly and radially inwardly relative to the vehicle 9, as generally indicated by the arrow 32 in FIGS. 2 and 3.

The downwardly sloped bottom wall 29 of tray 10 may be formed into discrete sections 34 and 35, if desired. The first section 34 may have a steeper downward slope than second bottom section 35. By utilizing two bottom wall sections, the citrus fruit is gradually and gently conveyed rearwardly, downwardly and radially inwardly to the inlet of duct transfer system 15 without damaging the fruit 31.

The tray 10 has a tubular flanged outlet opening 37 positioned at the bottom of back wall 30 of tray 10 at the center thereof. The tubular flange opening 37 is connected to the forward end of duct transfer system 15. The duct transfer system includes a plurality of interconnected hollow duct sections.

The forward or first section 15A is a flexible duct sealingly connected at its forward end to the tubular outlet opening 37 in tray 10. The second rigid and straight duct section 15B of the transfer system 15 is sloped upwardly from front to back and extends between and communicates with first flexible elbow duct section 15A and third flexible elbow duct section 15C. Fourth rigid duct section 15D is generally straight and extends horizontally between and communicates with third flexible elbow duct section 15C and fifth flexible elbow duct section 15E. Sixth rigid and straight duct section 15F is sloped upwardly from front to rear and extends between and communicates with fifth flexible elbow duct section 15E and seventh flexible elbow duct section 15G. The rear end of flexible elbow duct section 15G is sealingly connected to tubular orifice 38 at the upper inlet end of hopper 16.

As best seen in FIGS. 1 and 3, the duct transfer system 15 including duct sections 15A through 15G extend substantially along the axial centerline of the vehicle 9. The flexible elbow duct sections 15A, 15C, 15E and 15G permit the transfer system ducts to be elevated from the bottom of the tray 10 to the top of the hopper 16 in smooth arcuate gradations having relatively large radii to permit the smooth flow of citrus fruit therethrough.

The tubular orifice 38 may be 14 to 15 feet above ground level. The fruit being pneumatically conveyed through the transfer duct system is thus elevated approximately 12 to 13 feet along the length of the duct system, which can run approximately 30 to 35 feet. The axial orientation of the duct transfer system with gradual curves being provided by the flexible elbow duct sections for elevation purposes permits a relatively large diameter duct to be used, for example eight inches, to reduce clogging and fruit bruising or damage. To move fruit through the duct transfer system 15 from the tray 10 to the hopper 16, a pneumatic conveyance system is provided.

For this purpose, the hopper is provided with an outlet elbow 40 adjacent the tubular inlet opening 38. Elbow 40 communicates between the cavity 41 of hopper 16 and a vacuum tube 42 extending along one sidewall of the hopper 16. The bottom end of vacuum tube 42 has a flange 43 thereon which is normally sealed to a confronting flange 44 at the top of vertical vacuum tube 46. Vacuum tube 46 extends downwardly into blower 47, which is run by a hydraulic motor 48 mounted on the rear chassis 18 of frame 9. The hydraulic fluid tank 49 is positioned parallel to and opposite from diesel gas tank 24, with the duct transfer system 15 passing therebetween. The hydraulic fluid tank 49 contains a reservoir of hydraulic fluid allowing the hydraulic motor 48 to be selectively run on a continuous basis to in turn continuously run the blower 47.

A variable speed blower 47 draws air downwardly through vacuum tubes 42 and 46 to create a vacuum or submovable atmospheric condition within the cavity 41 of hopper 16. The blower operation and vacuum condition created thereby also draws air through the duct transfer system 15 from the tray 10 to the hopper 16, as indicated by arrows 50. This air movement pneumatically conveys the citrus fruit 31 delivered to the entrance of duct section 15A through the entire duct system and thence into the hopper. This pneumatic conveyance system delivers picked citrus fruit from the tray 10 through the duct transfer system to the hopper faster than pickers can deposit the fruit into the tray 10. Thus, the fruit harvesting apparatus 1 of the present system can be substantially continuously used along the aisles of the grove until the hopper 16 is substantially full of fruit. The pneumatically conveyed fruit passes through the tubular inlet opening 38 and enters the hopper, with the entrance orifice to elbow 40 of the vacuum tube system being covered by a screen or the like to preclude citrus fruit from being sucked therethrough.

Figure 14:
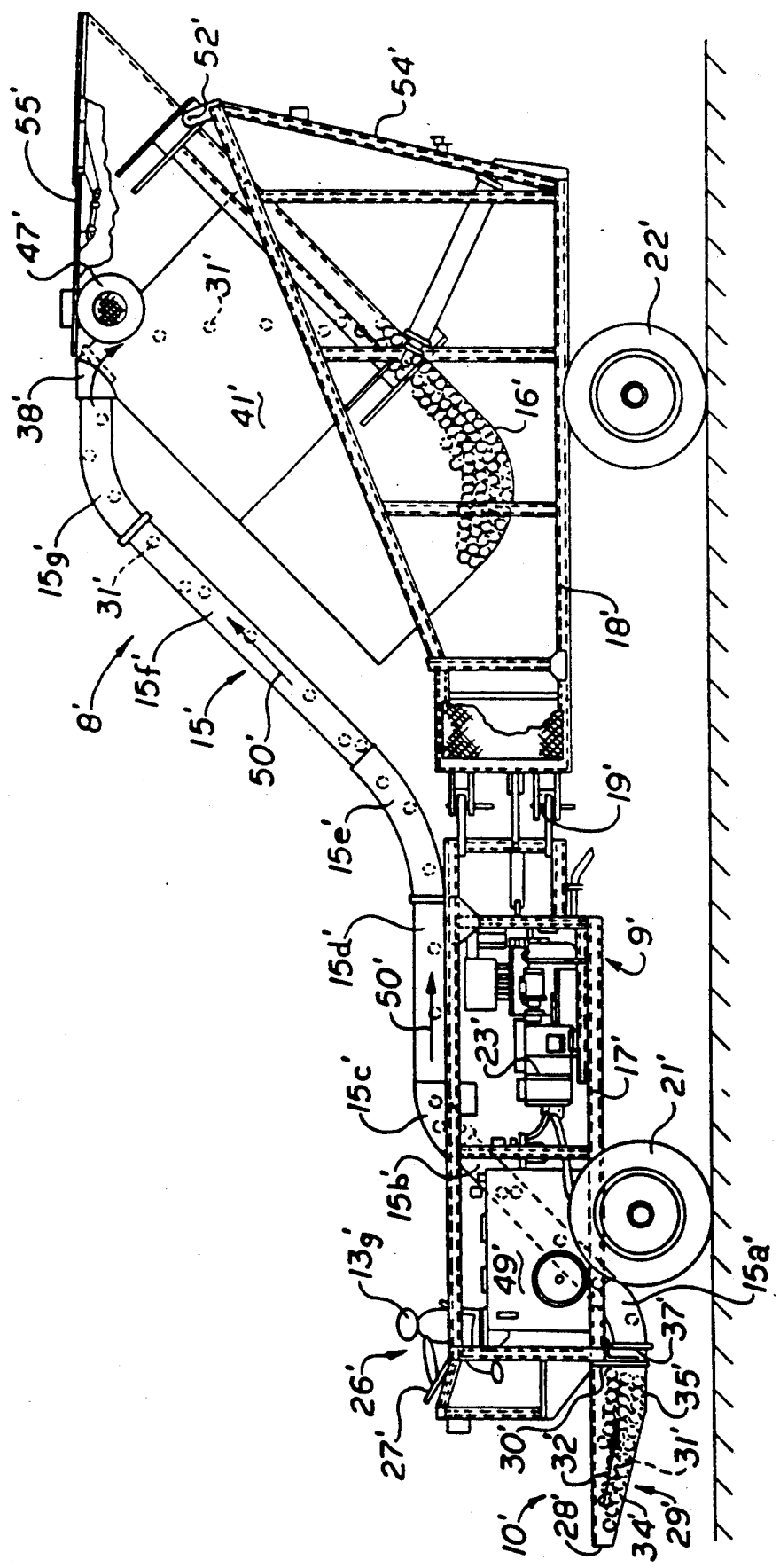
FIG. 14 is a view similar to that of FIG. 2, except showing the blower inside the hopper.

Alternatively, as is shown in FIG. 14, a variable speed blower 47' may be attached to the an inside upper portion of the hopper adjacent the tubular inlet opening 38. In such a system, the blower 47' draws air in the hopper upwardly to create a vacuum or sub-atmospheric condition within the cavity 41 of the hopper 16. This arrangement is believed to eliminate noise and redirect the exhaust air to the atmosphere above and away from the worker which is desirable. One may appreciate that with the blower 47', the components 40, 42, 43, 44, and 46 are not necessary.

When substantially filled, the hopper 16 can be pivoted from its normal reception position illustrated in FIG. 2 to its pivotally elevated dumping position. To this end, the hopper 16 is pivotally connected to the upper back end of rear chassis 18, as indicated at 52. Two transversely spaced piston cylinder assemblies 53 extend between a back support frame 54 on rear chassis 18 and the sidewall of the hopper 16. Selective extension of the piston rods of piston cylinder assemblies 53 is operative to pivot the hopper 16 about pivotal connection 52.

To provide clearance for this pivotal movement, the forward end of sixth duct section 15F and the rearward end of fifth flexible duct section 15E are disconnected from one another. Similarly, flanges 43 and 44 are disconnected from one another to uncouple vacuum duct 42 from vacuum duct 46. With these disconnections made, the hopper 16 is free to arcuately move around pivot connection 52 when the piston rod of piston cylinder assemblies 53 are extended.

When the piston rods are fully extended, the hopper has been pivotally moved to its dumping position. An outlet door 55 is positioned in top wall 56 of the hopper 16. With the hopper in its dumping position, the hopper wall 56 and fruit outlet door 55 are generally below the cavity 41 of the hopper and directly above the bed of a trailer positioned to receive the fruit. A piston cylinder assembly 57 is operative to open the door 55 to allow the fruit to be gravity fed from the hopper 16 to the bed of the trailer. In the dumping position, the hopper is inclined upwardly from back to front at a gentle slope or angle to allow the fruit to gradually be gravity fed from the cavity of the hopper to the bed of the trailer.

On occasion, the fruit harvesting vehicle of the present invention will be used with a fruit transporting vehicle having a higher fruit receiving bed and/or higher trailer sidewalls. To provide compatibility between the fruit harvesting vehicle and fruit trailers of all sizes, the hopper of the present invention in an alternative embodiment can be selectively vertically elevated prior to dumping, if necessary.

Figure 9:
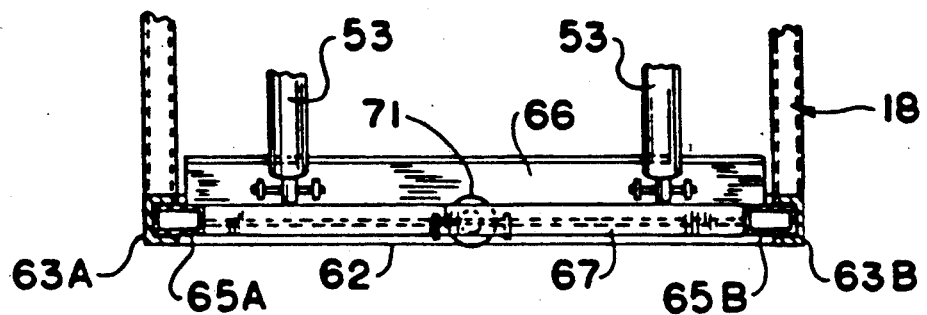
FIG. 9 is a horizontal cross section taken on the plane 9—9 of FIG. 8 showing the guidance of the movable frame to the fixed frame.

As viewed in FIGS. 7 through 10, the rear chassis assembly 18 includes a fixed rear frame, indicated generally at 60, and a vertically movable rear frame, indicated generally at 61. The fixed rear frame 60 includes a base, fixed channel 62 extending horizontally across the width of the rear chassis 18. The fixed frame further includes two parallel side channels 63A and 63B fixed to and extending upwardly from base channel 62. As best shown in FIG. 9, the side channels 63 face inwardly toward one another to provide guidance for the selective vertical movement of the movable back frame 61.

The movable back frame 61 includes two generally vertically extending parallel tubular side posts 65A and 65B. These tubular side posts are interconnected and rigidified by generally horizontal cross members comprising lower cross angle 66, middle I beam 67 and upper cross beam 68. Lower, middle and upper cross members 66 through 68 extend between and are connected to side posts 65A and 65B to form a rigid movable back frame assembly 61.

As best illustrated in FIG. 9, the tubular side posts 65A and 65B are respectively slidingly received in channels 63A and 63B of the fixed rear frame 60 to permit relative movement therebetween. This vertical movement of the movable rear frame 61 relative to the fixed frame 60 is selectively provided by a piston cylinder assembly 71 extending between base channel 62 of the fixed frame and the middle I beam 67 of the movable frame 61. Extension of the piston rod of piston cylinder assembly 71 will elevate the movable frame 61 relative to the fixed frame 60, with such vertical movement being guided by channels 63A and 63B on the fixed frame. Similarly, selective retraction of the piston rod of piston cylinder assembly 71 will lower the movable frame 61. The selective vertical movement of the vertically movable back frame 61 will result in concurrent vertical movement of the hopper 16. For this purpose, the transversely spaced piston cylinder assemblies 53 have their distal and pivotally connected to lower angle 66 of the rear movable frame. The piston rods of the piston cylinder assemblies 53 are pivotally connected at their respective proximal ends to the lower wall portion or hopper 16. The piston cylinder assemblies 53 thus extend between and are pivotally connected at their opposite ends of the rear movable frame 61 and the hopper 16. Similarly, the transversely spaced pivotal connections 52 of the hopper 16 to the movable frame 61 are positioned on the upper tubular beam 68 of that movable frame 61. Therefore, when the movable frame 61 is elevated, the connections between the movable frame and the hopper (as provided by the piston cylinder assemblies 53 and the hinge connections 52) results in the hopper 16 concurrently vertically moving with the movable frame assembly 61.

Figure 10:
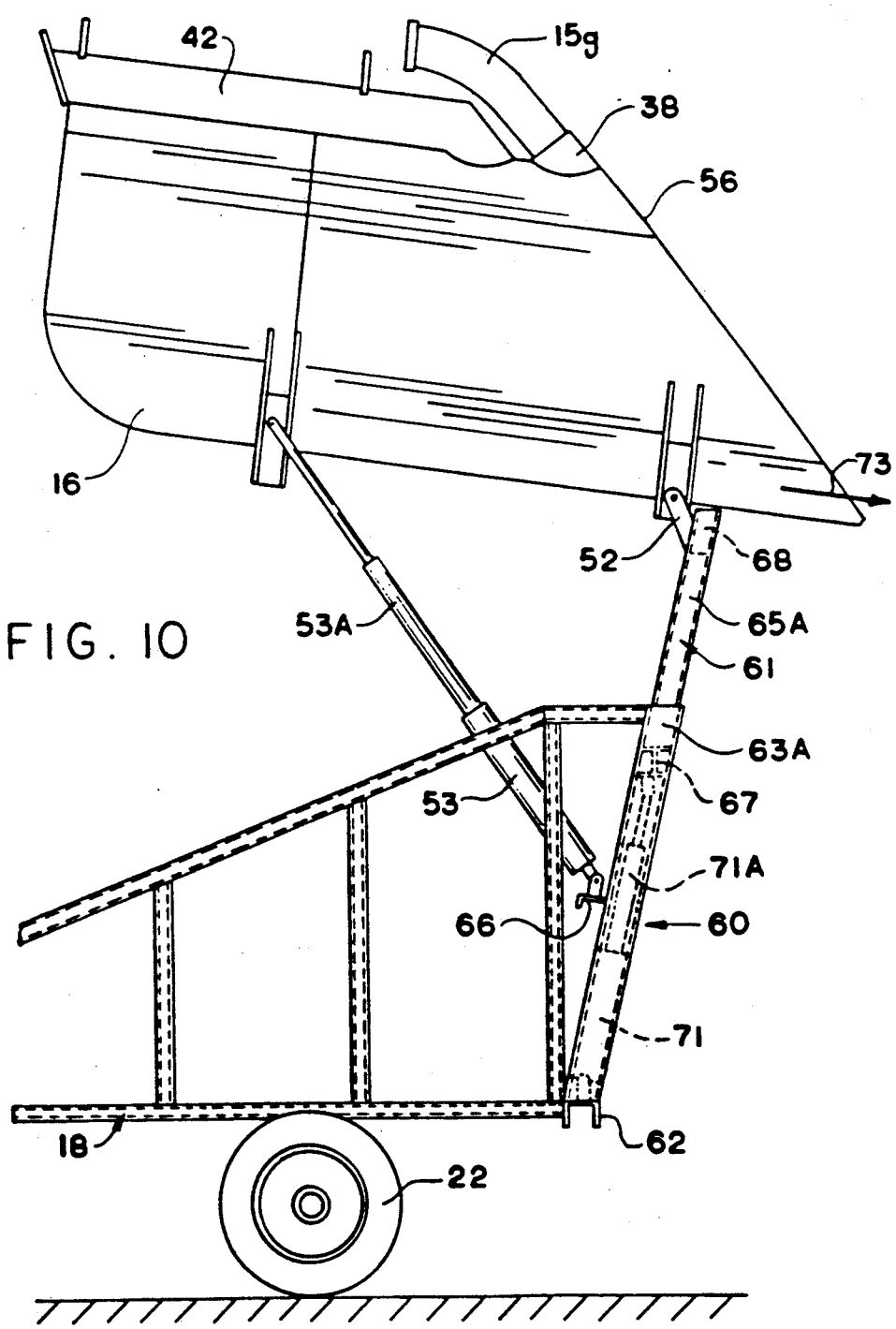
FIG. 10 is a partial side elevation similar to FIG. 7 but showing the hopper in an elevated and pivoted position to dump fruit into a fruit transfer vehicle.

The operation of the mechanism for selectively vertically elevating hopper 16 is believed apparent from the above description but is described hereinafter in the context of FIG. 10 for purposes of completeness. When the trailer body of the fruit conveyance vehicle has an elevated bed and/or elevated sidewalls, the piston cylinder assembly 71 is activated to vertically extend the piston rod 71A thereof to concurrently raise the entire rear movable frame 61 and hopper 16. When thus elevated to provide an additional vertical clearance of up to 10 feet (as required), the piston cylinder assemblies 53 are actuated. Vertical extension of the piston rods 53A of piston cylinders 53 pivots the hopper 16 about hinge connection 52 to the position illustrated in FIG. 10. In such position, the hopper is inclined slightly relative to the horizontal from front to back. The outlet door 55 is opened to allow the contained fruit to dump into the transport trailer in the direction indicated generally by arrow 73 in FIG. 10.

When the dumping is complete, the piston rods 53A of piston cylinder assemblies 53 are retracted to pivot the hopper 16 about hinges 52 to return the hopper to its normal "picking" position. Piston rod 71A of piston cylinder assembly 71 is then retracted to lower the movable frame 61 to in turn lower the hopper into its position within the side framework on the rear chassis 18. The hopper 16 is then in position to have ducts 15 E and F and flanges 43 and 44 reconnected in preparation for the next picking cycle.

It will be apparent from the foregoing that changes may be made in the details of construction and configuration without departing from the spirit of the invention as defined in the following claims. For example, the tray 10 on the front of vehicle 9 can be adapted to allow the tray to be selectively removably mounted on that vehicle, as illustrated in FIGS. 4 through 6.

For this purpose, the back wall 30 of the tray 10 may have two transversely spaced L-shaped mounting brackets, indicated generally at 75A and 75B, mounted thereto. Each of these mounting brackets is identical and mounting bracket 75B is illustrated for purposes of explanation in FIGS. 5 and 6.

L-shape mounting bracket 75B includes a vertical leg 6 and a horizontal leg 77. Vertical leg 76 of the mounting bracket is fixedly secured to the front surface of back wall 30 of tray 10. The horizontal leg 77 of L-shape mounting bracket 76B extends over and beyond the top of tray back wall 70. The horizontal leg 77 has a hole 78 positioned therein selectively to cooperate with a fixed post on the frame of the front chassis 17 of vehicle 9.

Such chassis frame includes a tubular cross brace 80 extending transversely of the vehicle near or at the front thereof. The tubular cross brace 80 has a vertically extending post 81 rigidly secured to its top wall. The tray 10 is lowered into position with the post 81 being received in the hole 78 in horizontal leg 77 on the L-shape mounting bracket 75. A retention pin 82 is then inserted through a bore 83 in the upstanding portion of post 81 to retain the mounting bracket 75B in position. In such position, the horizontal leg 77 rests against and is supported by the top wall of cross beam 80 on the vehicle frame to thereby mount the tray to the vehicle.

As was indicated above, the tray 10 includes a semi-circular front wall 28, a bottom wall 29 and a back wall 30. As such, the tray 10 may be viewed as including a bottom wall 29 and a set of substantially vertical side walls surrounding the bottom wall 29. The set of substantially vertical side walls includes a back wall 30 which is attached to the front end of the vehicle and a pair of walls extending from opposite ends of the back wall 30 which together define the semi-circular front wall 28. Thus, the set of side walls may be viewed as defining a semi-circular border around the bottom wall 29.

As was also indicated above, the tray 10 has an outlet opening 37 which is positioned at the bottom center of the back wall 30 of the tray 10 and which is connected to the forward section 15A of the transfer system 15. As was further indicated above, the bottom wall 29 of the tray 10 includes discrete sloped sections 34 and 35, and the union between these sections may be viewed as channel-forming sections of the bottom wall 29. Thus the tray 10 may be viewed as further including a tray channel which is at least partially defined by the channel-forming sections of the bottom wall, and more particularly, a tray channel which is defined by the channel-forming sections of the bottom wall and the tray opening 37.

The tray opening 37 may be viewed as being defined, at least partially, by the tray channel's rear edge. In the embodiment illustrated in FIGS. 1–10, the tray opening 37 is also a wall opening in one of the side walls, and more particularly, the back wall 30.

The tray channel may be viewed as including a substantially planar lower wall sloping towards the tray opening 37. "Substantially planar" in this context does not necessarily imply flat, but instead is intended to mean a surface which does not experience any angular turns. Thus, under this definition, a semi-cylindrical shaped channel could be considered "substantially planar." Furthermore, while this lower wall is preferably sloping, rather than exactly horizontal, it is still closer to horizontal rather than vertical, or its slope is less than 45°, and more preferably less than 20°. In this manner, the flow path of fruit through the tray opening 37 will be in substantially horizontal direction.

The forward section 15A of the transfer system 15 may also be viewed as having a lower wall which together with the lower wall of the channel forms a smooth transition surface, preferably in a substantially horizontal plane, between the tray and the transfer system. "Smooth transition surface" in this context corresponds to a surface which is either flat or has a gentle slope, such as less than 45° from the horizontal. Thus if a connection between the tray opening 37 and the transfer section 15A included an elbow, a smooth transition surface would not be created.

When necessary, the tray 10 can be removed from the vehicle 9. For this purpose, the retention pins 82 are withdrawn from vertically upstanding posts 81. The tray 10 is then sufficiently elevated for the horizontal upper legs 77 of the respective mounting brackets to clear the posts 81 on the vehicle 9 to allow the tray to be removed. An alternate tray may then be mounted on the vehicle 9 while this alternate tray may have a different configuration from the tray removed, it preferably includes mounting brackets 75A and 75B of identical spacing. The alternate tray is lowered into position with the holes on the horizontal legs 77 of the brackets respectively receiving the vertical posts 81 on the vehicle frame. The retention pins 82 are then placed through bores 83 in posts 81 to complete the mount.

The size and design of the alternate tray can be selected for the specific grove planting configuration being picked in order to maximize the efficiency of the harvesting system and method. For example, in groves having aisles only slightly wider than the width of the vehicle, the width of the tray could be reduced. This width reduction would allow some clearance to the side and front of the tray to provide room for the people harvesting the trees. In addition, the shape of the tray can be varied depending upon the capacity desired therefor.

Further, the position of the tray or trays relative to the vehicle can also be varied including, for example, alternate or additional trays mounted to the sides or back of the vehicle. The present tray system could also be added to a boom type picking and pruning machine to enhance its effectiveness for picking fruit from young trees or from the lower portions of more mature tall trees.

Figure 11:
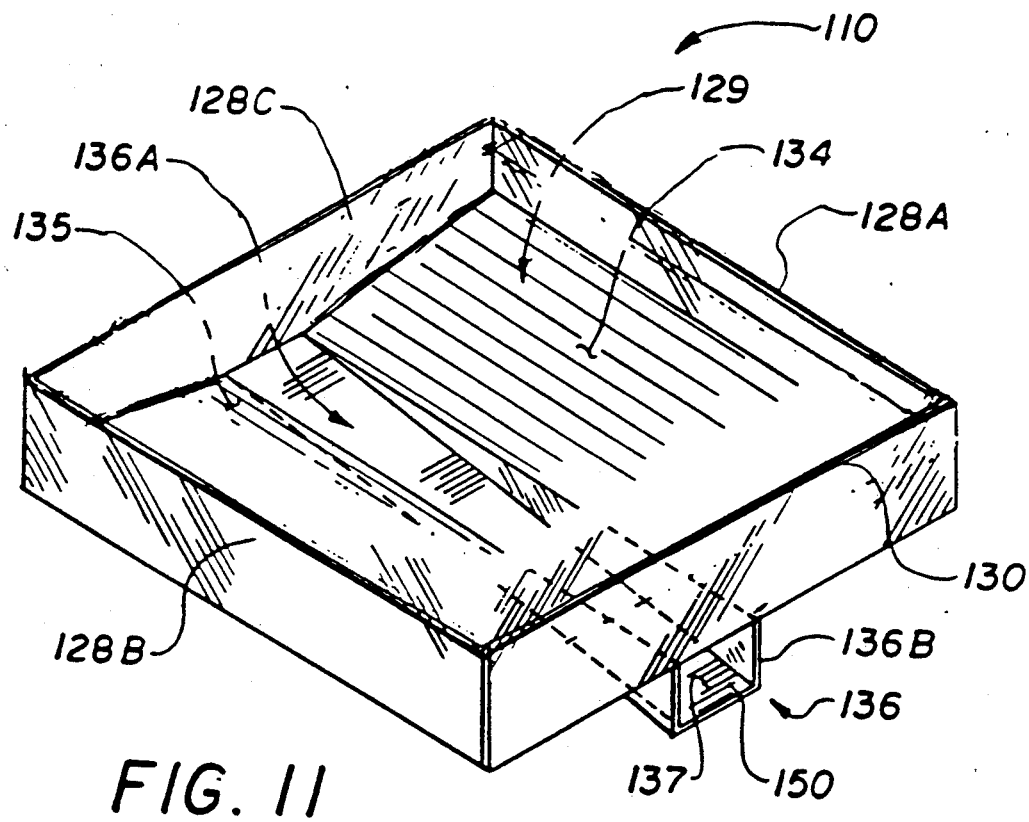
FIG. 11 is a perspective view of another tray which may be removably or permanently secured to the chassis frame of a fruit harvesting vehicle.
Figure 12:
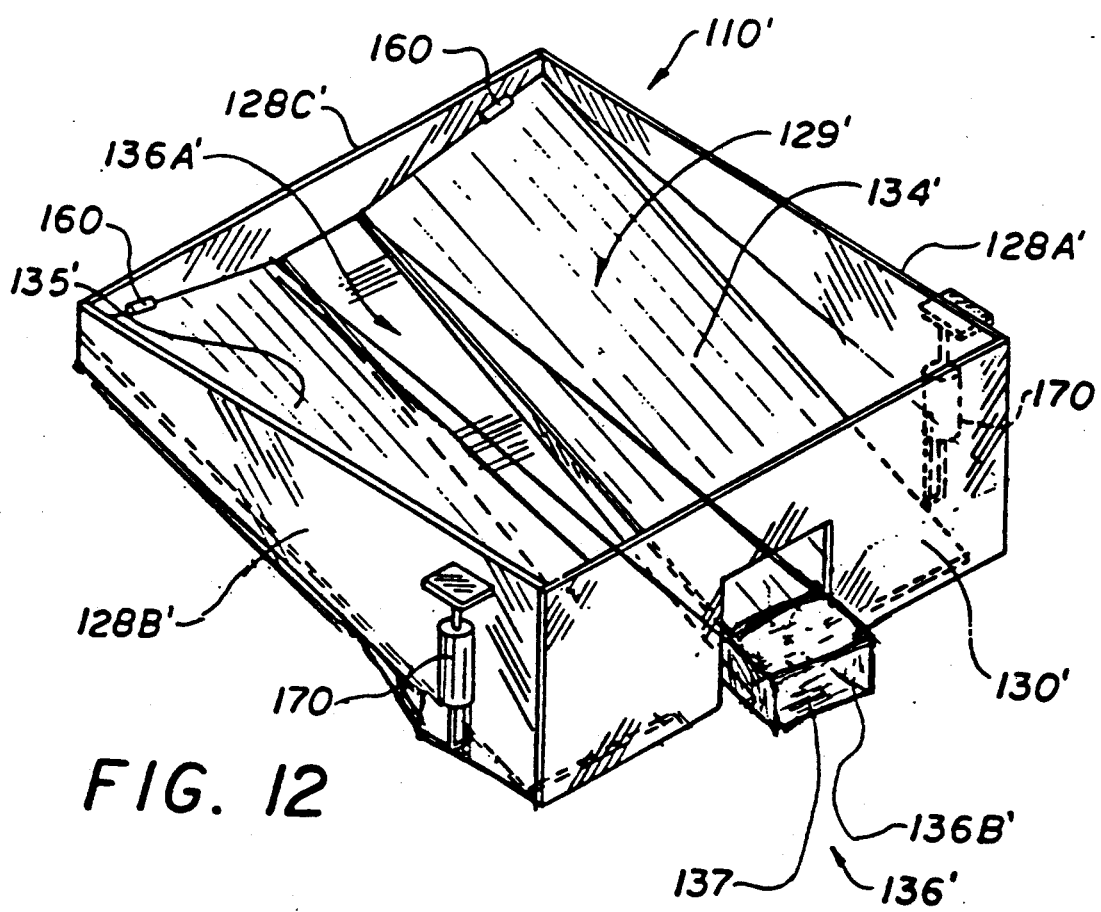
FIG. 12 is a perspective view of another tray which may be removably or permanently secured to the chassis frame of a fruit harvesting vehicle.
Figure 13:
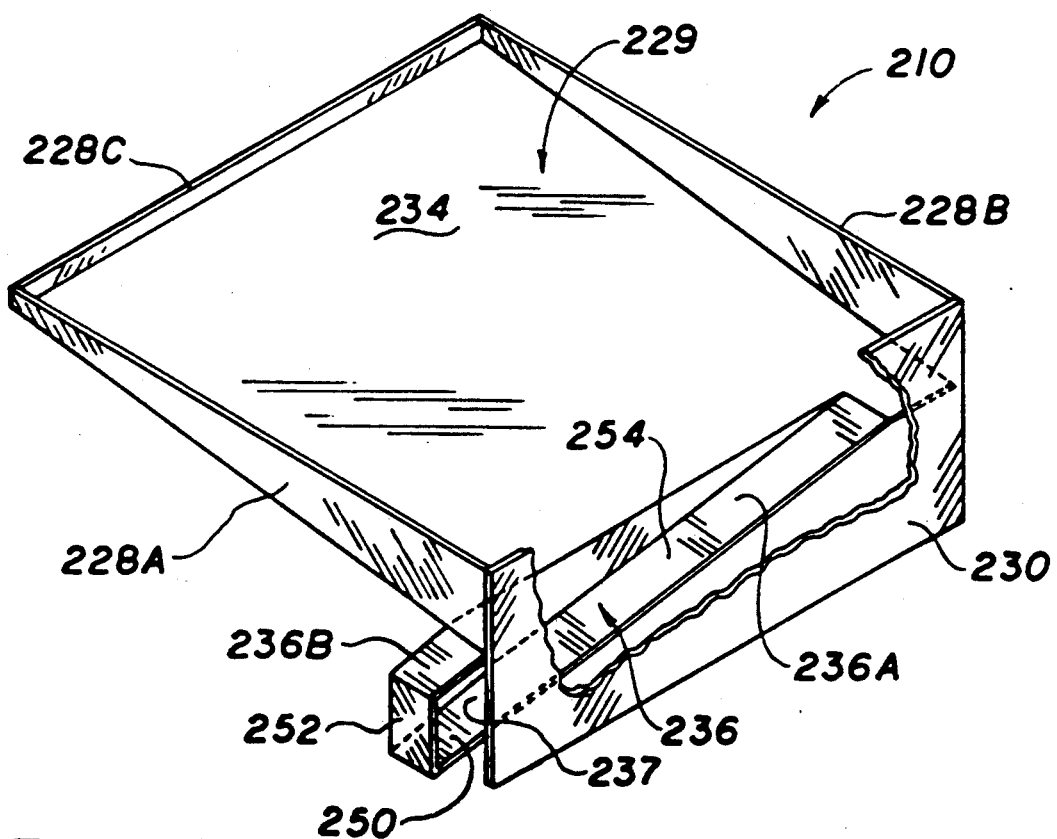
FIG. 13 is a perspective view of yet another tray which may be removably or permanently secured to the chassis frame of a fruit harvesting vehicle.

Turning now to FIGS. 11–13, some examples of alternative tray configurations are illustrated. Although not specifically shown in the drawings, these trays preferably include mounting components similar to those of the originally illustrated tray 10. The tray 110 shown in FIG. 11 includes a bottom wall 129 and a set of substantially vertical side walls surrounding the bottom wall 129. The set of side walls includes a back wall 130 which will be positioned adjacent to the front end of the vehicle 9 and a pair of walls 128A and 128B which extend from opposite ends of the back wall 130. The side walls 128A and 128B each extend perpendicularly outward from the opposite ends of the back wall 130 and these side walls, together with the back wall 130 and a third wall 128C, form a polygonal, or more particularly rectangular, border around the bottom wall 129. Such polygonal or rectangular geometry may be desired over a semi-circular shape as it may allow a more efficient use of space in the aisles between the rows of citrus trees. Additionally, a rectangular tray will increase the area of the bottom wall thereby more evenly distributing the received fruit.

The tray 110 further includes a channel 136 which is partially defined by channel-forming sections of the bottom wall 129 and the bottom wall includes sloping sections 134 and 135 which slope towards the tray channel 136. In this embodiment, the bottom wall 129 slopes toward the channel 136 but not towards the back wall 130 whereby the flow of fruit to the tray channel will be more gradual and even. The tray channel 136 includes a rear edge 150 defining the tray opening 137 which in the illustrated embodiment is positioned flush with the back wall 130 and thus may alternatively be viewed as a part of the back wall whereby the back wall would include the tray opening 137. However, the tray opening 127 could also be positioned forward or rearward of the back wall 130 whereby the tray 110 could be used as the primary means for attaching the tray to a vehicle.

The tray channel 136 further includes a substantially planar lower wall 136C sloping towards the tray opening 137. When the tray 110 is installed on the vehicle, the lower wall of the forward section 15A of the transfer system 15 and the lower wall 136C will form a smooth transition surface between the tray 110 and the transfer system 15. In this manner, picked fruit placed in the tray 110 will travel down the sloped section 134/135, into the channel 136, through the tray opening 137, and smoothly into the duct transfer system 15. It may be noted for future reference that the sloped sections 134 and 135 slope towards the channel 136 but do not slope towards the back wall 130.

Referring now additionally to FIG. 12, another tray 110' for the fruit harvesting apparatus 8 is shown in perspective. The tray 110' is similar to the tray 110 shown in FIG. 11 and like reference numerals are used to designate like parts with the parts of the tray 110' being followed by a prime (') suffix. However, the opening 137' in the channel 136' is positioned forward of the back wall 130'. Additionally, the tray 110' further includes a slope-adjusting device for selectively adjusting the slope of one or more sections of the bottom wall 129'. Alternatively, the device could include a separate independent mechanism for adjusting the lower wall of the channel 136', to thereby control the amount of fruit flowing towards the tray opening 137' (Slope-adjusting device in this context corresponds to any device, regardless of whether it is equivalent to the illustrated device, which may be used to selectively or automatically adjust the slope of one or more sections of the bottom wall of tray). For example, in FIG. 12 the sloped sections 134' and 135' are positioned so that they slope towards the channel 136' and also slope towards the back Wall 130'.

In the illustrated embodiment, this slope-adjusting device includes pivot hinges 160 which pivotally connect the front edge of the bottom wall 129' to the front wall 128C' and a slope-determining assembly 170 which selectively pivots the bottom wall 129' relative to these pivot hinges 160. In this manner, the slope of the bottom wall 129' may be adjusted when fruit size and crew size warrant such adjustments. The illustrated slope-determining assembly 170 is in the form a drive cylinder for mechanically adjusting the slope of the bottom wall 129'. However, it may also be in the form of a pin-and-slot system for manual adjustments. Additionally, the slope-determining assembly may also be in the form of a spring-system which automatically adjusts the slope of the relevant portions of the bottom wall 130' depending on the weight of the picked fruit within the tray. The back wall 130' includes an opening 180 to accommodate the movement of the bottom wall 129' and the tray opening 137' will always move in a substantially vertical plane as the slope of the bottom wall 129' is being adjusted.

Referring now additionally to FIG. 13 another tray 210 for the fruit harvesting apparatus 8 is shown in perspective. The tray 210 includes a bottom wall 229 and a set of substantially vertical side walls surrounding the bottom wall 229. The set of side walls includes a back wall 230 which will be positioned adjacent the front end of the vehicle 9 and a pair of side walls 228A and 228B which extend from opposite ends of the back wall 230. The side walls 228A and 228B each extend perpendicularly outwardly from the opposite ends of the back wall 230 and these side walls, together with the back wall 230 and a third wall 228C, form a polygonal, or more particularly rectangular, border around the bottom wall 229.

The bottom wall 229 includes channel-forming sections which at least partially define a channel 236 and a sloping section 234 which slopes towards the tray channel 236. In this embodiment, the tray channel 236 is positioned adjacent and parallel to the back wall 230. As was indicated above, the tray opening may be positioned anywhere along the path of the tray channel (in front, in back, or aligned with the back/side wall of the tray) as required by the needs of the specific piece of equipment. In FIG. 13, the tray opening 237 is located beyond the side wall 228A of the tray 210 whereby this tray may accommodate a vehicle in which the transfer system is not centrally located.

The tray channel 236 also includes a substantially planar lower wall 236A sloping towards the tray opening 237. In the assembled fruit harvesting apparatus, this lower wall 236A and the lower wall of the forward section 15A of the transfer system will form a smooth transition surface between the tray 210 and the transfer system 15.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. A fruit harvesting apparatus comprising a vehicle having a front end and a back end; means for moving the vehicle along the ground; a tray, located at the front end of the vehicle, for receiving picked fruit; a pivotable hopper, mounted to the back end of said vehicle, for temporarily storing the picked fruit; and a pneumatic transfer system for transferring the picked fruit from said tray to said hopper;
   said hopper including a blower which creates a vacuum within said hopper, said blower being attached to an upper portion of said hopper.

2. A fruit harvesting apparatus comprising a vehicle, means to move that vehicle along the ground, tray means mounted to the vehicle adjacent the ground to receive picked fruit, the tray means having a sloped bottom wall to convey the received fruit to a first end of a transfer means, means to pneumatically convey the fruit from said first end of said transfer means, through said transfer means, to a second end of said transfer means, said second end of said transfer means being coupled to a hopper carried by said vehicle, the hopper temporarily storing the picked fruit;
   wherein the hopper is pivotally connected to the vehicle adjacent the back end thereof and may be selectively moved about that pivotal connection to remove fruit temporarily stored therein; and
   wherein said apparatus further includes a blower which creates a vacuum within said hopper, said blower being located within said hopper.

3. A fruit harvesting apparatus as set forth in claim 2 wherein said blower is attached to an upper portion of said hopper.

4. A hopper for fruit harvesting apparatus, said hopper comprising a receptacle for temporarily storing picked fruit and a blower which creates a vacuum within said receptacle, said blower being located within said receptacle.

* * * * *